(12) United States Patent (10) Patent No.: US 8,666,846 B1
Chenault et al. (45) Date of Patent: Mar. 4, 2014

(54) DETERMINING ITEM AVAILABILITY

(75) Inventors: John Chenault, Seattle, WA (US); Paul Nordstrom, Seattle, WA (US); Todd Stumpf, Lynnwood, WA (US); Gintaras Woss, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 1906 days.

(21) Appl. No.: 09/921,011

(22) Filed: Aug. 1, 2001

(51) Int. Cl.
*G06Q 10/00* (2012.01)

(52) U.S. Cl.
USPC ............................................. 705/28; 705/22

(58) Field of Classification Search
USPC .......................................................... 705/28
See application file for complete search history.

(56) References Cited

U.S. PATENT DOCUMENTS

| | | | |
|---|---|---|---|
| 5,727,164 A | 3/1998 | Kaye | |
| 5,930,761 A | 7/1999 | O'Toole | |
| 5,940,807 A | 8/1999 | Purcell | |
| 6,023,683 A * | 2/2000 | Johnson et al. | 705/26 |
| 6,081,789 A | 6/2000 | Purcell | |
| 6,272,472 B1 | 8/2001 | Danneels | |
| 6,285,986 B1 | 9/2001 | Andrews | |
| 6,324,522 B2 * | 11/2001 | Peterson et al. | 705/28 |
| 6,341,271 B1 | 1/2002 | Salvo | |
| 6,418,416 B1 * | 7/2002 | Rosenberg et al. | 705/28 |
| 6,654,726 B1 * | 11/2003 | Hanzek | 705/26 |
| 5,239,480 A1 | 8/2004 | Huegel | |
| 6,990,488 B1 | 1/2006 | Chenault | |
| 7,249,044 B2 | 7/2007 | Kumar | |
| 2001/0034658 A1 | 10/2001 | Silva et al. | |
| 2001/0047285 A1 * | 11/2001 | Borders et al. | 705/8 |
| 2001/0056395 A1 | 12/2001 | Khan | |
| 2002/0010659 A1 * | 1/2002 | Cruse et al. | 705/28 |
| 2002/0042756 A1 * | 4/2002 | Kumar et al. | 705/26 |
| 2002/0046157 A1 | 4/2002 | Solomon | |
| 2002/0069115 A1 | 6/2002 | Fitzpatrick | |
| 2002/0077919 A1 | 6/2002 | Lin et al. | |
| 2002/0077929 A1 | 6/2002 | Knorr et al. | |
| 2002/0095307 A1 | 7/2002 | Greamo et al. | |
| 2002/0107763 A1 | 8/2002 | Palmer | |
| 2002/0111880 A1 | 8/2002 | Stutts | |
| 2002/0147651 A1 | 10/2002 | Hoar et al. | |
| 2002/0147657 A1 | 10/2002 | Callender | |
| 2002/0165782 A1 * | 11/2002 | Falkenstein et al. | 705/22 |
| 2002/0178074 A1 * | 11/2002 | Bloom | 705/26 |
| 2002/0188499 A1 * | 12/2002 | Jenkins et al. | 705/10 |
| 2002/0188516 A1 | 12/2002 | Farrow et al. | |
| 2004/0220884 A1 | 11/2004 | Khan | |

OTHER PUBLICATIONS

U.S. Appl. No. 10/997,063, filed Nov. 24, 2004.

(Continued)

*Primary Examiner* — Mussa A Shaawat
(74) *Attorney, Agent, or Firm* — Robert C. Kowert; Meyertons, Hood, Kivlin, Kowert & Goetzel, P.C.

(57) ABSTRACT

A facility for processing a request for information about a specified item is described. The facility receives the request from an originator. In response to receiving the request, the facility generates a response to the request that contains information about the specified item. The facility also determines a current level of availability of the specified item, and, based upon this determined level of availability, determines, for each of a number of ordering actions, whether the ordering action is currently available for the specified item. For each ordering action determined to be currently available for the specified item, the facility augments the generated response by adding a control for performing the ordering action. The facility sends the augmented response to the originator of the request.

17 Claims, 3 Drawing Sheets

(56) References Cited

OTHER PUBLICATIONS

U.S. Appl. No. 11/150,493, filed Jun. 9, 2005.
White, Ron, "How Computers Work," Millennium Ed. Que Corporation, Sep. 1999.
Derfler, Frank J. et al., "How Networks Work," Millennium Ed. Que Corporation, Jan. 2000.
Gralla, Preston, "How the Internet Works," Millennium Ed., Que Corporation, Aug. 1999.

* cited by examiner

DETERMINING ITEM AVAILABILITY

RELATED APPLICATIONS

This application is a continuation-in-part of U.S. application Ser. No. 09/919,606, entitled "DETERMINING ITEM AVAILABILITY," filed on Jul. 30, 2001, which is hereby incorporated by reference in its entirety.

FIELD

The present invention is directed to the field of electronic commerce.

BACKGROUND

The World Wide Web ("the Web") is a system for publishing information, in which users may use a web browser application to retrieve information, such as web pages, from web servers and display it.

The Web has increasingly become a medium used to shop for products. Indeed, thousands and thousands of different products—as well as other items such as service contracts—may be purchased on the Web. A user who plans to purchase an item on the Web can visit the Website of a Web merchant that sells the item, view information about the item, give an instruction to purchase the item, and provide information needed to complete the purchase, such as payment and shipping information.

It is typical for a user to view information about a product on an "item detail page." The information provided on an item detail page may include such information as the item's name and source, a picture of the item, a description of the item, reviews or ratings of the item, a price at which the item is offered for sale, and a control—such as a button—that may be activated by the user to order the item from the web merchant.

In some senses, shopping at a web merchant is significantly more compelling than shopping at a physical merchant. For example, a user that shops at a web merchant can complete a shopping task without the extra inconvenience, time cost, and pecuniary cost associated with visiting a physical merchant in person. Also, a user may shop at two or more web merchants simultaneously, permitting him or her to simultaneously gather information about the product from several sources.

Although shopping at a web merchant has several distinct advantages such as those discussed above, shopping at conventional web merchants sometimes has certain disadvantages. One such disadvantage is that ordering controls displayed for items by many web merchants may enable a user to order an item that is not currently available from the merchant, or may at least initially mislead a user to believe that the item is available. This may happen, for example, with an item that, in addition to being out of stock at the merchant, is without prospect of replenishment, such as an item that is out of print, or an item that was formerly obtained from a single supplier that has ceased carrying the item. Inversely, ordering controls displayed for items by many web merchants may prevent a user from order an item that is currently available from the merchant, such as an item that, though it is not in physical inventory, will be received by the merchant from a supplier in a short time. This second phenomenon can prevent a web merchant from effectively accepting pre-orders for a highly-anticipated item whose release date is in the near future.

Also, many web merchants report an amount of time needed to fulfill an order for one or more items in a way that is inaccurate, imprecise, or both. For example, a typical merchant might report that fulfillment of an order for a particular item will take "1-2 weeks," based upon a determination that the item is out of stock. This report may be inaccurate if the item is one that can be resupplied and prepared for shipment in 2 days (and thus unnecessarily prevent a user from buying the item who needs the item to be shipped within 5 days), or if the item is one for which resupply will take more than 2 weeks (and thus unnecessarily disappointing a user who does order the item and needs it to be shipped within 2 weeks). Additionally, this report might be regarded as imprecise because of the wide range of time specified.

Additionally, many web merchants have trouble quickly and effectively "switching off orderability" for an item that is otherwise available for ordering. This can be useful, for example, when an item is the subject of a safety recall, or when a new law makes selling the item illegal. Moreover, in cases where it is possible to disable ordering for an item, this may requires overriding electronic records of inventory in the item to inaccurately show no inventory in the item. Because such electronic records are typically treated as an authoritative accounting of actual inventory, this sort of overriding may result in "losing" the actual inventory, in the sense that the merchant no longer knows that it possesses the inventory.

Further, for web merchants that has inventory for an item in a number of different locations, it can be difficult for a certain period of time after an order is placed for this item to accurately assess the availability of the item for additional ordering. Where such an assessment is inaccurate, the web merchant may misinform prospective purchasers about the availability of the item for ordering.

In view of these disadvantages of conventional systems for managing inventory and ordering for web merchants, a more effective approach to managing inventory and ordering for web merchants would have significant utility.

DETAILED DESCRIPTION

Figure 1:
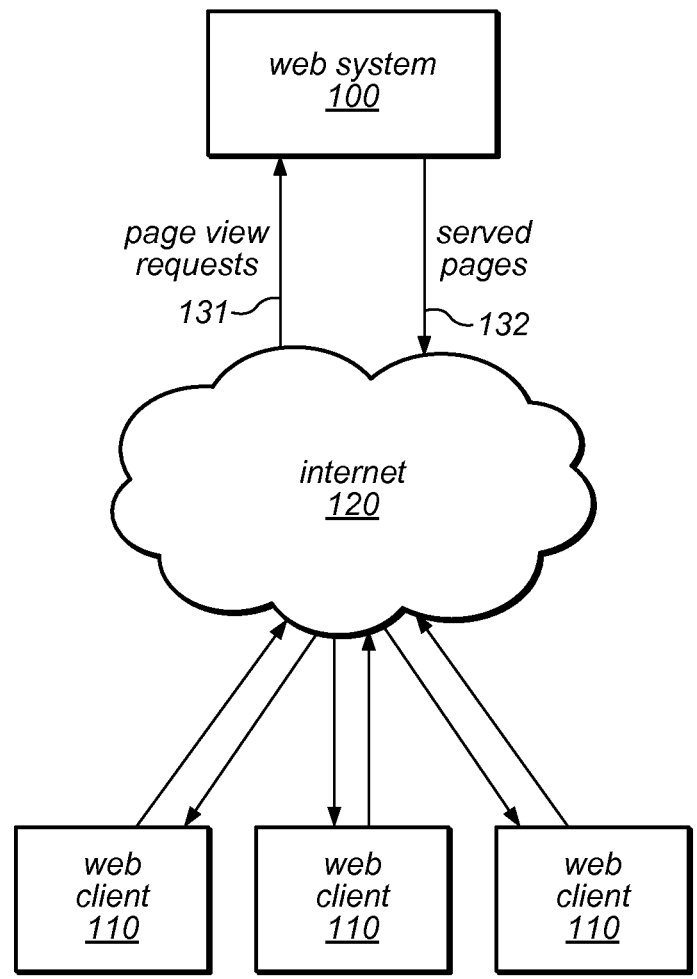
FIG. 1 is a high-level data flow diagram showing data flow within a typical arrangement of components used to provide front-end functionality of the facility.

A software facility for managing inventory and ordering for a web merchant or other electronic commerce purveyor ("the facility") is described. The facility uses asynchronous messaging to maintain the currency of a model of all current physical inventory possessed by the merchant. This inventory model can represent inventory at a number of different distribution centers ("DCs") or other locations used by the merchant to store inventory. The model further represents expected future changes to physical inventory as adjustments to the physical inventory needed to determine if inventory is available for sale. These can include complete (and, in some cases, incomplete) orders for items from customers; purchase orders expected to be received by the merchant from suppliers; and inventory transfers between DCs or other merchant locations.

In committing each inventory update for an item to its inventory model, the facility determines whether the update changes the availability status of the item. In cases where it does, the facility delivers an asynchronous message from the inventory system to a web system, which uses such messages to maintain an up-to-date model of item availability for ordering from the merchant. When a customer requests an item detail web page for a particular item (also called an "ASIN") from the merchant, the web system uses the item availability model to generate up-to-date characterizations of the availability of the item, such as how soon the merchant can ship the item out, which it incorporates in the requested item detail web page. In many embodiments, the timing information in the item availability model is relatively finely-grained, enabling the characterization to be relatively precise with respect to how soon the merchant can ship the item out. In some cases, indications of how soon the merchant can ship the item out are based on historical information about how quickly the merchant has been able to resupply itself for similar items from suppliers that carry the item.

The web system typically also uses the item availability model to determine which types of ordering controls, if any to include on the item detail page. For example, for an item that won't be available in the near future but is expected to be available later, the facility may include a control in the item detail page for placing the item on the user's wish list for later ordering, but may omit controls for immediately ordering the item. Also, when the merchant receives an order for an item, such as an order generated by the customer using ordering controls included in the item detail page, the facility typically rechecks the item availability model to ensure that the item is still available for order before it accepts the order from the customer.

Use of the facility enables the merchant to display specific and accurate information about whether items are available for purchase, and how soon they can be shipped. Use of the facility further helps the merchant avoid accepting orders for items that cannot be shipped out in an acceptable period of time, and enables the merchant to accept orders for items that, while not in physical inventory, will be received in inventory quickly enough to timely ship them to customers that have ordered them. Embodiments of the facility may also be used to track the negative effect on inventory of orders received but not yet assigned to a DC. Additional embodiments of the facility enable its operator to inhibit ordering of a particular item without corrupting how the inventory model models the merchant's inventory for that item. Accordingly, the facility provides substantial utility to the merchant, and to the merchant's customers.

FIG. 1 is a high-level data flow diagram showing data flow within a typical arrangement of components used to provide front-end functionality of the facility. A number of web client computer systems 110 that are under user control generate and send page view requests 131 to a web system 100 via a network such as the Internet 120. These requests typically include as page view requests for item detail pages and page view requests conveying item ordering instructions. Within the web system, these requests may either all be routed to a single web server computer system, or may be loaded-balanced among a number of web server computer systems.

The web system typically processes such requests using information provided by back-end components discussed below in conjunction with FIG. 2, and replies to each with a served page 132. For example, for a page view request requesting an item detail page, the served page is the requested item detail page, containing information about the availability of the item, as well as any controls for ordering the item that are consistent with the item's availability. For a page view request conveying item ordering instructions, such as those generated by the user by activating an ordering control included in an earlier-served item detail page for the same item, the served page is an order confirmation page in cases in which the page view request is sent when the item is available to order, or an order declined page indicating that the item is no longer available to order.

Figure 2:
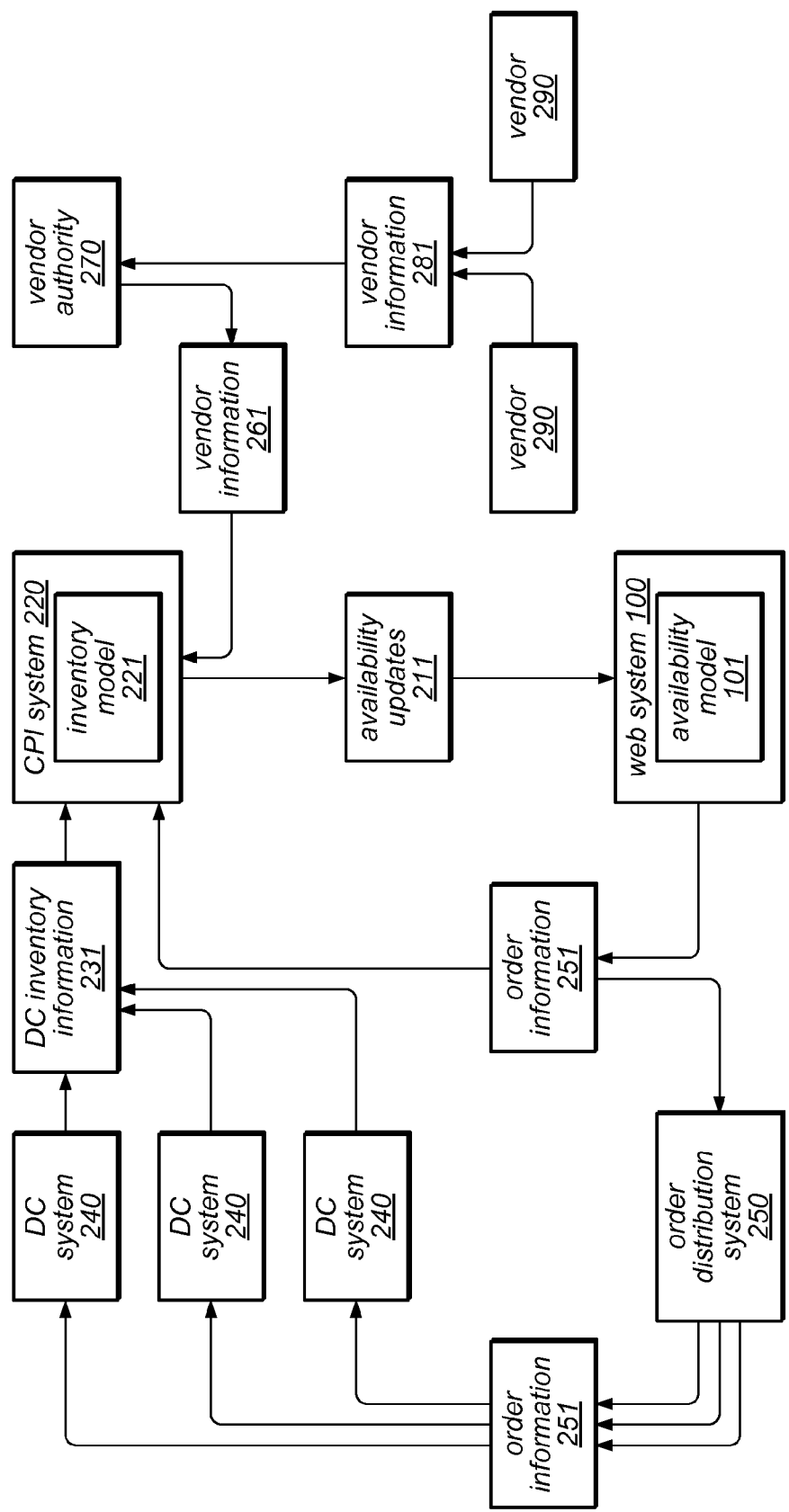
FIG. 2 is a high-level data flow diagram showing data flow within a typical arrangement of components used to provide back-end functionality of the facility.

FIG. 2 is a high-level data flow diagram showing data flow within a typical arrangement of components used to provide back-end functionality of the facility. In general, the data flow shown and described is implemented using asynchronous messages. The web system 100 uses an item availability model 101 to process page view requests as discussed above. The item availability model models the level of availability of at least a portion of the items that may be ordered from the web merchant, and is maintained by the web system using a stream of availability updates 211, each reflecting a change in the availability status of an item.

Availability updates received by the web system are produced by an inventory modeling system 220, also referred to herein as the "GPI system." The inventory modeling system maintains an inventory model 221 reflecting the current inventory of each item held by each DC, as well as anticipated events that will affect such inventory, such as pending customer orders (expected to diminish inventory) and purchase orders scheduled to be delivered to distribution centers in the near future (expected to augment inventory). When an inventory change for an item that reflects a change in availability of the item occurs in the inventory model, the inventory modeling system sends an availability update to the web system advising the web system of the availability change of the item.

The inventory modeling system receives inventory information from a number of sources, including distribution center systems 240 that model the inventory of individual DCs; one or more vendor authorities 270 that model the availability of items from suppliers used by the web merchant; and the web system, which receives orders for items from customers.

When the web system receives an order, it generates order information 251, which contains information identifying the items ordered and the quantity of each item ordered. The web system sends the order information to an order distribution system 250 for assignment to a DC, as well as to the inventory modeling system. When the order distribution system receives the order information, it delegates the order to a selected one of the web merchant's DCs 240 for fulfillment, forwarding the order information 251 to that DC. The selected DC processes the order described in the order information, and the corresponding DC system 240 sends information 231 about its inventory, updated to reflect processing of the order, to the inventory modeling system. In response, the inventory modeling system updates its inventory model. The DC systems periodically send other DC inventory updates to reflect other changes to DC inventory, such as purchase orders placed with or received from vendors, inter-DC transfer shipments sent or received, etc.

Because the order information is sent to the inventory modeling system in parallel with the order distribution system, the inventory modeling system is able to adjust its inventory model to reflect the order immediately after the order is received, rather than later, after the order has been processed by the order distribution system and a DC.

The inventory modeling system receives updates 261 about the availability of items from suppliers 290. This information 281 is collected by one or more vendor authority system 270.

Figure 3:
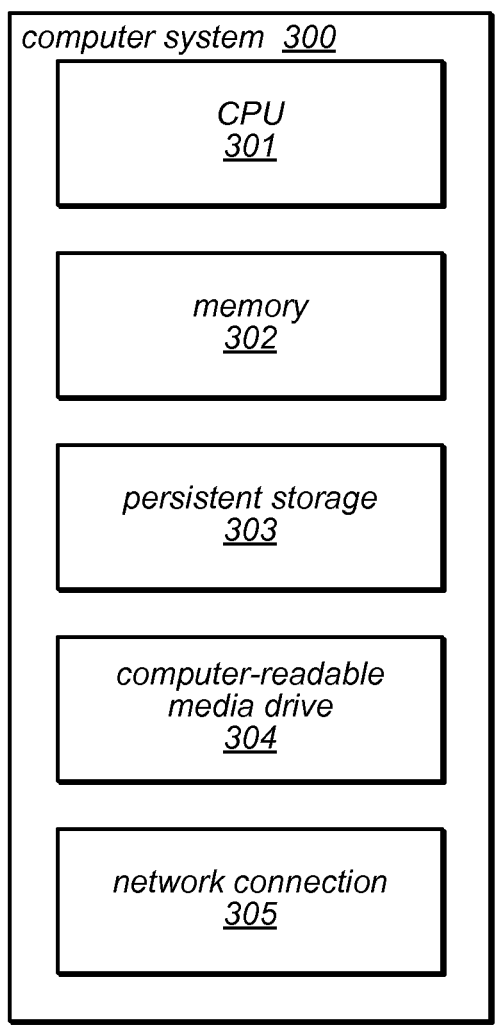
FIG. 3 is a block diagram showing some of the components typically incorporated in at least some of the computer systems and other devices on which the facility executes.

FIG. 3 is a block diagram showing some of the components typically incorporated in at least some of the computer systems and other devices on which the facility executes. These computer systems and devices 300 may include one or more central processing units ("CPUs") 301 for executing computer programs; a computer memory 302 for storing programs and data while they are being used; a persistent storage device 303, such as a hard drive for persistently storing programs and data; a computer-readable media drive 304, such as a CD-ROM drive, for reading programs and data stored on a computer-readable medium; and a network connection 305 for connecting the computer system to other computer systems, such as via the Internet. While computer systems configured as described above are preferably used to support the operation of the facility, those skilled in the art will appreciate that the facility may be implemented using devices of various types and configurations, and having various components.

Additional details about the facility's design, implementation and use follow.

The Global Perpetual Inventory ("GPI") system is a way to provide real time inventory and availability information to the enterprise. It models inventory in Distribution Centers ("DCs"), that are on arriving Purchase Orders ("POs"), that are in Vendor warehouses, and that are in partner drop ship facilities. The facility uses this information to provide and control indications of item availability on the merchant website, and to provide real time data to plan how to fulfill customer promises. The facility's architecture is designed as a set of loosely coupled systems whose primary communication is by asynchronous messaging. These are:

DC Systems—Software that runs at a DC and provides inventory information which the GPI system consumes. DC Systems also update SQL Database tables that the GPI system utilizes to initialize itself.

GPI System—Software that models the inventory, and communicates with the outside world. This runs in a cluster of machines in a central location.

Web System—One of the users of the GpiSystem, but one that is highly integrated enough to deserve special mention. The web system receives inventory availability information from GPI and updates an internal cache of availability information that we use to determine availability, buyability, etc on the website. It also publishes order creation/change etc events that GPI uses to update it's inventory picture.

Vendor Authority—Software located in various places that provides realtime vendor inventory information (i.e., more than simple catalog availability). At present this is located as part of Drop Ship DCs, but architecturally the Vendor Authority can be located in any convenient location.

Other Systems—We interact with other system in the enterprise. At present these are pretty much one way interactions. This will change with Pop Crackle and close integration with ATP.

The following defines, for each system, the roles and responsibilities, the processes that are part of the system, and of the state maintained.

DC Systems
Roles and Responsibilities—
Communicate current inventory, and any changes in inventory to the rest of the enterprise by publishing inventory messages.
Processes—
DIM Daemon (DC Inventory Management). When any DC tool changes inventory, it posts a message in a local inventory database. The Dimm Daemon picks up that change, and publishes the event that caused the changes as well as the current inventory levels for the Asin that was changed.
Data Stores—
Raw information as to Availability is kept in database tables. Persistent asynchronous Queues are used to notify the system that an inventory event has occurred.

GPI System—
Roles and Responsibilities—
Maintain an in-memory model of inventory across the enterprise: the current amount of inventory in the DCs, as well as inventory expected to arrive and inventory at our vendors and drop ship partners. Communicate to the Website the current availability for all Asins that Gpi is tracking based on the in-memory inventory model. Write that availability information to persistent store (an Oracle database). Provide more general inventory information to any process that requests it such as ATP. Listen for any messages that update inventory, orders, etc and update the model appropriately.
Processes:
GpiDaemon—Responsible for maintaining state in the Shared Memory for single Asins, and for publishing interesting state changes.
GpiBundleDaemon—Similar to GpiDaemon. Maintains state for Bundles of Asins. (An Asin which is really a pre-defined set of other Asins).
GpiInfoDaemon—Request/Reply mechanism for outside agents who want to get information about inventory from Gpi.
IAMD—Inventory Availability Manager Daemon—Listens to messages from the GpiDaemon and GpiBundleDaemon and computes the desired website availability. Publishes the availability to the Website and saves the state in an Oracle database table.
GpiReinitDaemon and GpiRefreshDaemon—Responsible for initializing the shared memory, and for keeping the shared memory in sync if messages are delayed or dropped.
VendorLeadtimeComputation—Computes the vendor lead time for products based on histories of past vendor lead times, and on operational overrides. Saves this information in Berkeley DB files for various consumers (GpiReinit and Refresh daemons AND the website libraries)
GpiPurchaseOrderWatcher—Looks for new purchase orders. If it finds them, it adds them to the Gpi shared memory.
GpiRunRateCollector and GpiRunRateCalculator—Two daemons that collect order history run-rates and then compute the estimated exhaustion date for inventory.
Data Stores:
Inventory information is maintained in a shared memory cache by Gpi. This cache is replicated across multiple boxes to assure reliability. Availability information is put into an Oracle database. Vendor lead time information is kept in a vendor lead time database.
Web System:
Roles and Responsibilities.
The Website systems publish information as to customer behavior such as order creation, cancellation, putting items in a shopping cart, etc. It listens to messages about inventory availability changing (from the Gpi System) and puts that information into a cache on each online box. It implements a library object that computes proper availability to show on the website based on generic catalog information, Vendor lead time information, and information from the cache. It uses the availability information returned to determine if an Asin is buyable, if we should show a one-click button, what the appropriate messaging to show to the customer is, etc.
Processes and Libraries—
IACM—Inventory AvailabilityCacheManager. Initializes itself using the SQL table that represents availability, and from availability update messages published by IAMD. Keeps the InventoryAvailabilityCache (Which is a cache of Asins that Gpi is actively managing)

Obidos—publishes information as to customer activity such as creation or cancellation of orders. (Actually, for implementation reasons, it communicates to a separate communication daemon via Unix message queue's, and the daemon actually does the publish), LibAsinAvailability—Computes item Availability information for an Asin based on Catalog information, Vendor Lead Time information, and the Inventory Cache.

EnablePurchase—Computes if an item is buyable, if it can be one-clicked, etc based on the Availability information and product group of the item.

Data Stores:

AvailabilityCache. A memory mapped file that stores all information for Asins that Gpi is actively tracking.

Catalog—memory mapped files that store catalog type information. For our purposes this includes an idea of 'Underlying availability' to use if there is no other data.

VendorLeadTimeAvailability—A Berkeley DB file that provides data as to vendor lead time to be used when the Asin is not being actively tracked using Gpi.

Vendor Authority

Roles and Responsibilities:

Provide real time vendor quantity information for a selected set of Vendors and the Asins they carry. The system both publishes events when the reported quantity available at a vendor changes, and provides an interface that external uses can use to query the current list of vendors, and get inventory quantities for each vendor.

Processes:

VendorAuthorityDaemon <Validate name with cthomas>: Daemon that manages the inventory information. Typically one per vendor. Currently use only for drop ship vendors, but soon to do more.

Date Stores:

Persistent vendor state is kept in Oracle SQL database tables.

Other Systems

Roles and Responsibilities:

Other system can provide information as to changes in order status (Customer Service), or may use Inventory information in planning (ATP or Available To Promise System).

Message Flows in the System

In loosely coupled systems that use asynchronous messaging, it is important to understand the message flow the occurs between the systems. In this section we describe the messages that are used to communicate between the various systems. We are not attempting to document here the messages which pass within a system and are not intended to be visible outside the system, nor are we discussing debug or administrative messaging.

For each system we list the messages that it owns, What the message represents, and detail the contents of the message.

Then for each system we will note the messages that it subscribes to, and what it does when it gets such a message.

Ownership of Messages:

DC Systems:

Dc.Availability.InventoryChange=(Dc string, Asins[Asin string, Reason[Type string, Id string, Delta int], Inventory[Bucket string, CountInBucket int]])

Published when inventory changes. For each DC, a list of Asins that have changed in the transaction is included. Included for each Asin are a list of Reasons for the change (i.e., received PO, Received order, Misc) and, where appropriate, the delta value from that reason. Then we get the inventory numbers based totals in each bucket. (Buckets are values such as reserve, prime, supply, nonprocess, etc.);

Gpi Systems:

Cofs.Iam.AsinAvailabilityUpdate=(Asin string, DepletionTime int64_t, LeadtimeType int, Leadtime int64_t, LeadtimePad int, ReleaseCycle int, SequenceNumber int64_t, SupplyCategory int, SupplyStockQuantity int, SupplyStockQuantityType int)

Published when an inventory availability change occurs. For each Asin, the following is provided:

DepletionTime—the date at which we expect to go out of stock on the current inventory bucket (For selected Asins)

Leadtime type—Duration, Date, or Unknown

Leadtime—Duration or Date as determined by the Leadtime Type flag)

LeadtimePad—Number of hours to add to Leadtime to get to a surity time (For example, by adding the LeadTime pad we get to a number that we will estimate we will meet 85% of the time).

ReleaseCycle—An enum reflecting overall availability, having the following values:

NotYetPublished (release), GenerallyAvailable, IntermittentlyAvailable, NoMoreAvailable, Suspended (a business decision has been made to stop selling the item), Recalled (a safety recall has been issued for this item). Where ReleaseCycle has the value Suspended or Recalled, the facility typically prevents users from ordering the item. In some embodiments, a flag called DisableOrdering is instead used for this purpose.

SupplyCategory—In Inventory, In Transit, AtVendor, NotAvailable, NotTrackedByGpi SupplyStockQuantityType—Infinite, Number, Unknown, NotAvailable SupplyStockQuantity—(if SupplyStockQuantityType is Number) the number available.

SequenceNumber—a unique, monotonically increasing number put into each message. Used to detect gaps.

Cofs.Iam.Request.AsinAvailabilityUpdatesSince=(Host string, Start int64_t, Stop int64_t)

Cofs.Iam.Reply.AsinAvailabilityUpdatesSince=(Start int64_t, Stop int64_t, SeqNumber int, SeqTotal int, AsinList [Asin string, DepletionTime int64_t, LeadtimeType int, Leadtime int64_t, LeadtimePad int, ReleaseCycle int, SequenceNumber int64_t, SupplyCategory int, SupplyStockQuantity int, SupplyStockQuantityType int])

This is a request for missed messages. The requestor includes the last good message number it received (in the 'Start field') and optionally what the stop number should be. If the number of messages to be returned is too large (such as greater than 10,000) an empty reply message is received, else a message with data for the Asins is returned. For each Asin, the information in the AsinAvailabilityUpdate message is returned, as well as the specified start and stop numbers.

Cofs.Gpi.Request.ATPSourcingOptions=(AsinInfo [Asin string, Quantity int], TimeConfidence float, QuantityConfidence float, DcsToUse [Dc string], Encumbrances [Id string])

Cofs.Gpi.Reply.ATPSourcingOptions=(AsinInfo [Asin string, Status int, DcDetails [Dc string, Availability [Quantity int, When Avail time_t, Cost float, Source int]]])

Request/reply for Inventory information for ATP (Available to Promise) system. The Reply includes, for each Asin, a Status that indicates if Gpi is tracking this Asin, and for each DC requested, the inventory information. Inventory Availability information consists of the Quantity, how long till it is available, what any additional cost would be, and what the source is (IE vendor, PO, in inventory, etc)

Web Systems

Website.OrderMgr.CustomerOrderCreated=(OrderId string, OrderItems [Asin string, Quantity int])

Website.OrderMgr.CustomerOrderModified=(OrderId string, OrderItems [Asin string, Quantity int])

Website.OrderMgr.CustomerOrderChanged=(OrderId string, OrderItems [Asin string, Quantity int]);

Website.OrderMgr.CustomerOrderCanceled=(OrderId string);

Messages produced by the website when an order is created, modified, canceled. Similar messages are produced by Customer Service when they modify or cancel an order.

Vendor Authority.

VAA.Update=(VAAName string, VendorDC string, ASIN string, Quantity string);

Published when the Vendor Authority sees an update for a particular Asin. We provide the name of the VendorAuthorigy, the Name of the vendor location that has changed, and the Asin and quantity information.

VAA.BatchUpdateComplete=(VAAName string, VendorDC string, LastUpdated uint64)

Published when the VAA has completed a batch update and has a number of changes that we can ask for.

VAA.Request.BatchAvailability=(VAAName string, VendorDC string, Seed string, FrameSize int32, RequestId int32)

VAA.Reply.BatchAvailability=(VAAName string, VendorDC string, Items [ASIN string, Quantity string] NextSeed string, LastFrame bool, RequestId int32)

Request/Reply for VAA information. The request specifies a particular VAAName for which information about a Vendor is to be provided. For the initial request, the caller passes in a NULL string and the VAA starts at the 'beginning'. The caller requests how many Asins the reply should contain, and gives a requestID that will be returned unchanged. The reply has the Asin/quantity information, and returns a 'Next Seed'. When a subsequent request is issued for more Asins, the caller passes in this seed value to tell the VAA daemon where to continue from. If this is the last frame of info, the LastFrame flag will be set to true.

Message Subscription by System

In general, the daemon processing a request must subscribe to the corresponding message, and the daemon receiving the reply must subscribe to the reply. The general published messages that the systems subscribe to are as follows.

Dc Systems:
None
Gpi Systems:
Dc.Availability.InventoryChange
  Update shared memory cache of inventory information. If this causes a change in Website Availability publishes an AsinAvailabilityUpdate message.
Website.OrderMgr.CustomerOrderCreated
Website.OrderMgr.CustomerOrderModified
Website.OrderMgr.CustomerOrderChanged
Website.OrderMgr.CustomerOrderCanceled
  Update shared information as to orders and their encumberances of inventory prior to the DC reflecting inventory. May cause an AsinAvailabilityUpdateMessage
VAA.Update
  Update vendor availability for that Asin.
VAA.BatchUpdateComplete
  Request an update of all Vendor info from the VAA
Web System:
Cofs.Iam.AsinAvailabilityUpdate
  Update the InventoryAvailabilityCache.
Vendor AuthoritySystem
None Data Structures in the System There are several data structures that are shared among different processes. This section details those data structures. Each repository is treated and presented as objects. This section focuses on the data portion of those objects.

Gpi Inventory Model

Inventory information is stored in shared memory on multiple boxes. The shared memory model is maintained by the GpiDaemon and GpiBundleDaemon processes. The shared memory itself has a hash table of Asin Objects (to quickly access Asin information) and pointers to the head/tail of an LRU chain that threads itself through the Asins. When an Asin is accessed, it moves to the head of the chain. When the number of Asins in the system grows too large, the LRU chain is used to delete the least recently accessed Asin. A million or more item identifiers may be kept in the cache. Access to the data is controlled via semaphores. The facility preferably implements a read/write lock for each item identifier.

To facilitate access and modification, and to isolate multi-threaded programming from the GPI user, a manager library manages access to the shared memory. When a user wants to read information from the library, he makes a call that copies the current Asin information to a temporary object and he then can examine the copy. The read lock is released before the object is returned to the user. Similarly, to update an Asin, a user creates a temporary object that defines changes to the object and submits it to the library. The library makes the update, and then informs a callback function that a change was made. This callback function may notify an external user of changes in availability, etc.

The Asin objects represent the inventory information for a single Asin. The data includes:

| | |
|---|---|
| String | Asin - The amazon SKU we are tracking. |
| Int | globalReservation - Global reservations taken for order not yet processed by a DC. |
| Int | reservationCushion - A cushion of reservations that we use to keep a safety stock. |
| Int | ReplenishmentStrategy - An Enum that defines how we replenish the item. |
| Int | ReleaseCycle - An enum reflecting overall availability, having the following values: NotYetPublished (release), GenerallyAvailable, IntermittentlyAvailable, NoMoreAvailable, Suspended (a business decision has been made to stop selling the item), Recalled (a safety recall has been issued for this item). Where ReleaseCycle has the value Suspended or Recalled, the facility typically prevents users from ordering the item. In some embodiments, a flag called DisableOrdering is instead used for this purpose. |

-continued

```
Time_t    RunRate - When we expect to stock out of the item - or use up the closest inventory.
Bool      isLeaf - set if Asin is a Leaf.
Bool      isBundle - Set if it is a bundle.
Bool      isAlwaysTracked - Set if this Asin is always managed by Gpi.
SharedVendor * PsharedVendor - A pointer to a Shared Vendor. (We treat this is a vector of
          shared vendor information.)
DcInfo * PfirstDc - Pointer to first DC. (We treat this as a vector of DCs)
Additionally we have next/previous pointers to manage the hash chain, and the LRU chain.
```

The DcInfo object contains information about inventory in a DC. The data includes:

```
String dcName
DcInfo * nextDc (This is how we implement the vector of DCs)
Inventory * firstByDate This is a linked list of inventory information we carry. Inventory is a base
class for various types of possible inventory. The info is sorted in date order.
```

There are several types of Inventory classes, all derived from the base inventory.

```
InStock inventory. - Inventory that is in the DC and can be picked
ReserveInventory - Inventory that is quickly available to be picked.
PO Inventory - Inventory that is scheduled to arrive from a vendor
XFER Inventory - Inventory being transferred to the DC from another DC
Private Vendor - Inventory from a vendor for a single DC
Shared Vendor - Inventory from a vendor shared by multiple DCs
The base class for inventory provides some common access methods. These include:
    getType( ) - get the type of inventory (IE inStock, Reserve, etc)
    getUnits ( )- get the number of units in the inventory bucket (Available to promise, or
    total in inventory, )
    getAvailableWhen/Date( float numSd). Get the time that the inventory will be available.
    One of the innovations of Gpi is that you pass in the number of standard deviations you
    want to include for this value
    getNextByDate( ) - get the next inventory in date available order.
    getIncrementalCost ( )- get any incremental cost for the Asin
    isInfiniteSupply( ) - set if we have infinite supply
    isSuppressedForAvail( ) - Some inventory bucket we choose not to show in Website
    availablitiy. This identifies those inventory units.
The Base Class Data includes:
    BaseInventory * nextByDate;
    Bool              suppressForAvail;
    Bool              isInfinite;
    Int               Type;
InStockInventory represents inventory available to be picked in a DC. The data associated with in
stock inventory includes:
    Int               total Units;
    Float             totalUnitsStdDeviation;
```

It can be difficult to determine for certain what inventory is in the DC, or when a PO will arrive. This uncertainty is represented in the model by storing not only the quantity (units or time) for an item, but also a standard deviation for that value (expressed as a percentage of the total). The quantity is what we think the most likely answer is for the value (such as the number of units considered to be pickable) and the Standard Deviation is the percentage of the quantity that is one standard deviation. For example, if the total units were 100, and the totalUnitsStdDeviation were 2%, to determine how many to promise using three standard deviations of certainty, the facility would exclude 6% of the totalUnits value returning an answer of 94. This pattern of standard deviation is through the objects for both time and units. (Time is typically increased, rather than decreased, by standard deviations.)

```
ReserveInventory - Represents inventory in the DC which is not pickable.
    Int               totalUnits
    Float             totalUnitsStdDeviation;
    Time_t            durationTillPickable
    The durationTillPickable is how long it will take the inventory to be put into a pickable
    location.
```

-continued

PO and XFER inventory -- These contain the same data elements. The type in the base class is different, but that is all. These represent either inventory arriving on a Purchase Order, or inventory which is arriving on a Transfer between DCs. Think of this as Arriving Inventory.
```
    Int           totalOrdered;
    Int           totalReceived;
    Int           encumbered;
    String        id;
    Time_t        originationTime
    Time_t        targetArrivalTime
    Time_t        receiveProcessTime
    Float         unitsStdDev
    Float         timeStdDev
```
Note that the total ordered must be tracked in order to apply the unitsStdDev properly. The calls to find out how many are available have to look at toal ordered, modify by the Std Deviation factors, and subtract the number received and number encumbered.
Id is simply an ID value for the PO number.
Origination, and target arrival time tells you when we started the PO, and when the target arrival time is. Again the full range is needed for the StdDev calculations.
ReceiveProcessTime is how long it will take to receive the inventory into the DC.
PrivateVendorInventory -- vendor information that applies only to one DC.
```
    Int           TotalInventory
    Int           numberEncumbered
    Time_t        durationToArrive;
    Time_t        receiveDuration
    Float         unitsStdDev
    Float         timeStdDev;
    String        vendorId
```
Id is VendorName. Other fields should be self explanatory.

Shared Vendor is a vendor whose quantity is shared among multiple DCs. Information about a shared vendor is divided into a public vendor portion, which tracks the total quantity and standard deviation for the vendor (which is a record off of the Asin), and an inventory portion that has lead time data. The public vendor portion is as follows:

```
SharedVendor - Vendor shared among multiple DCs
    Int             TotalInventory
    Int             numberEncumbered
    Float           unitsStdDev
    String          vendorId
    SharedVendor *  pnext;
    Bool            suppressForAvail
    Bool            isInfinite
```

The corresponding Inventory piece is the representation of how many units we have planned to use at the DC plus the lead time to that DC

```
    SharedVendorInventory
        Time_t          durationToArrive
        Time_t          receiveDuration
        Float           timeStdDev
        Int             numberEncumbered
        String vendorId
```

Gpi Pending Orders Cache

GPI also manages a cache of information about orders that we have taken, but have not hit the DC as yet. This cache is maintained in each GpiDaemon as it needs the information to determine how to handle messages from the Website as to order changes, etc, and to understand what to do when we get Inventory adjustment messages from the DC.

We represent this cache as an object (GpiPendingOrders) that manages outstanding order information. It holds instances of GpiPendingOrder which is the object that understands the order. We maintain a hash on the Asin in GpiPendingOrders to assure fast access by Asin.

The GpiPendingOrder object consists of:
String orderId
Vector<GpiPendingOrderAsin>Asins;
Where orderId is the id of the order, and Asins is a vector of Asin/quantity information.

The GpiPendingOrderAsin object consists of
```
    String          Asin
    Int             originalQuantity;
    Int             numSatisfied;
```

Where Asin is the Asin we have the order, originalQuantity is the number of units that the order is for, and numSatisfied is the number we have assigned to a DC;
Item Availability Cache The item availability cache is a cache of information kept on the online boxes that maintains information about the Asins that GPI is managing inventory for. The logical data elements in the cache are the same information as described in the cofs.Iam.AsinAvailabilityUpdate message. These are:

| | |
|---|---|
| Time_t | DepletionTime - the date at which we expect to go out of stock on the current inventory bucket (For selected Asins) |
| Enum | LeadtimeType - Duration, Date, or Unknown |
| Time_t | Leadtime - Duration or Date as determined by the Leadtime Type flag) |
| Int | LeadtimePad - Number of hours to add to Leadtime to get to a surity time (For example, by adding the LeadTime pad we get to a number that we will estimate we will meet 85% of the time). |
| Enum | ReleaseCycle - NotYetPublished (or released), GenerallyAvailable, IntermittentlyAvailable, NoMoreAvailable, Suspended, Recalled |
| Enum | SupplyCategory - In Inventory, In Transit, AtVendor, NotAvailable, NotTrackedByGpi |
| Enum | SupplyStockQuantityType - Infinite, Number, Unknown, NotAvailable |
| Int | SupplyStockQuantity - (if SupplyStockQuantityType is Number) the number available. |
| Int | SequenceNumber - a unique, monotonically increasing number put into each message. Used to detect gaps. |

Vendor Lead Time Data

A Berkeley database file that contains average lead time information to our distribution network for Asins. The intent of this data is to provide a backup number when Gpi is not tracking the Asin.

The data structure consists of:

| | | |
|---|---|---|
| String | Asin - The Asin we are tracking | |
| Time_t | averageLeadTime - what is the average time to get this Asin from our recourse vendor | |
| Time_t | surityLeadTime - what is the surity time to get this Asin from our recourse vendor | |

Computation of Availability

Website availability is a vector of several values computed for an Asin that is used to generate an indication of availability to be displayed for the Asin. The associated data elements are as follows.

```
QuantityType        quantityType;  [NUMBER, INFINITE, or QUANTITY_UNKNOWN]
long                quantityValue;
DurationType        durationType [KNOWN, UNKNOWN, INFINITE]
long                bestEstimatedLeadTime;           meaningful if DurationType is
Known
long                surityEstimatedLeadTime;   Lead time for Asin at surity factor.
SupplyCategory      supplyCategory;   Where the inventory is in supply chain. See below for
values.
ReleaseCycle        releaseCycle;   Where the Asin is in it's release cycle. See below for
values
time_t              releaseDate;      When released ( if not already out)
CalcStatus          calcStatus;       [FOUND_ASIN, NOASIN, CORRUPT_CACHE]
time_t              estimatedOutOfStockDate;   When we expect to run out of inventory
        enum SupplyCategory{
            IN_INVENTORY=1
            ON_PO,
            AT_VENDOR,
            VIRTUAL,
            NO_SUPPLY_AVAILABLE
        };
        enum ReleaseCycle{
            NOT_YET_RELEASED=1,
            NOT_YET_RELEASED_PREORDER,
            NOT_YET_RELEASED_VENDOR_ORDERABLE,
            RELEASED_AND_AVAILABLE,
            RELEASED_BACKLIST,
            INTERMITTENTLY_AVAILABLE,           // Not dependable
            NOT_AVAILABLE,
            OOP,
            UNKNOWN_RELEASE_CYCLE,
            RECALL,
            SUSPENDED
```

One algorithm for computing availability is as follows:

1. Set up values for 'Not Found' IE NOT_AVAILABLE, NO_SUPPLY_AVAILABLE, etc.
2. From the Catalog, get the 'underlying stock-code' and the release date.
3. If the Asin is not found, set calcStatus to NOASIN and use the not found values.
4. Else - look at release date / underlying stock code and consider modifying the stock code (For example, if the stock code is not yet released, and the release date is yesterday, convert to at distributor.
5. Using the catalog underlying stock code, fill in what the availability values would be if we have no other information in the system. We convert the various stock codes to specific hard coded lead time values and known replenishment strategies.
6. Look in the Vendor LeadTimes database. If the item is found, overwrite the lead times with the data found in the database.
7. Look in the IACM. If the item is found in inventory, adjust the supply category to in_inventory and set the quantity available to show what is in inventory. If the item is found on a PO, and the PO is arriving sooner than the vendor lead time, adjust the supply category to PO, and set the quantity available. If the Asin is virtual, override the supply category, and mark as an infinite quantity available immediately. If the Asin is marked as not_available, set the supply category appropriately and update.

At this point the availability values have been computed and can be returned.

Calculation of Estimated Out of Stock Date

When the facility displays inventory counts on the website, it also typically displays an indication of when the item is expected to run out. It does so by filling in a date/time in the Gpi Shared memory (which is sent up to IACM and put into the cache) for those items that have a "cliff" in their availability. I.e., when we run out of the current bucket of supply, the time until next available supply is greater than a defined cut off time (such as two weeks).

A separate daemon in the Gpi process space listens to OrderEvents (GpiRunRateCollector). This daemon maintains in an oracle table the history of orders for Asins in one hour buckets for the past several days, and in one day buckets for some time before that. When a new hour begins, the facility invokes a batch process (GpiRunRateCalculator) that examines this database table. For each entry in the table, the facility examines Gpi to see if there is an impending cliff of availability. If there is not, the facility sends a message to Gpi telling it to set the expiration time to '0' (which means there is no expiration time). If there is a cliff, the facility calculates how much longer we believe we will have inventory based on the historical run rate, and on the current availability. The facility then sends a message to the GpiDaemon telling it of the new estimated expiration date.

When the GpiDaemon gets the 'Change ExpirationDate message', it updates its shared memory. If this is a change to the date, the GpiDaemon notifies IAMD of the change, and IAMD updates the Asin_orig_promises Oracle database table, and sends a message to the on-lines (the web servers of the web system) with the new value. When the on-line box sees a date, it converts it into a message such as 'We expect to exhaust all inventory in 2 hours' or 'At current sales rate, we expect to be out of stock in less than 24 hours'.

Calculation of Buyability, Display Text on the Website

The facility uses availability information described above to generate a textual characterization of an item's availability to display on the website.

The combination of availability values that map to strings to display is determined. Additionally, a set of flags is computed for each set of availability values such as for each product line 'is Buyable', 'is OneClickable', etc.

The facility accomplishes this by examining supplyCategory, ReleaseCycle, DurationType, and QuantityType fields for the Asin. The allowed values for these fields are sequential enums. For each product group, a config file defines acceptable patterns of values for these fields. The facility traverses the list of possibilities and, when it finds one, that maps to a list of various strings for displaying information to the user. A similar mechanism is used to determine if an Asin is buyable, one-clickable, if an "e-mail me when the item becomes available" button should be displayed, etc. Catalog fields are also used to evaluate these flags.

Code Block 1 below shows a sample configuration file that maps display fields for Books and Music.

```
CODE BLOCK 1
#-----------------------------------------------------------------------
# SUPPLY STATUS
#-----------------------------------------------------------------------
# Column 1:       in-inventory
# Column 2:       on-purchase-order
# Column 3:       at-vendor
# Column 4:       virtual
# Column 5:       no-supply-available
#-----------------------------------------------------------------------
# RELEASE CYCLE
#-----------------------------------------------------------------------
# Column 1:       not-yet-released
# Column 2:       not-yet-released-preorder
# Column 3:       not-yet-released-vendor-orderable
# Column 4:       released-and-available
# Column 5:       released-backlist
# Column 6:       intermittently-available
# Column 7:       not-available
# Column 8:       oop
# Column 9:       unknown-release-cycle
# Column 10:      recall
# Column 11:      suspended
#-----------------------------------------------------------------------
# DURATION
#-----------------------------------------------------------------------
# Column 1:       known
# Column 2:       unknown
# Column 3:       infinite
#-----------------------------------------------------------------------
# QUANTITY TYPE
#-----------------------------------------------------------------------
# Column 1:       number
# Column 2:       infinite
# Column 3:       unknown
```

```
CODE BLOCK 1
# The default configuration:
availability_information_default:
    # This is the DEFAULT definition of availability.
    gpi-availability-scenarios = (
        # supply-status    release-cycle    duration    quantity-type
        # 12345            12345678901      123         123
        ( 10000            00011010000      000         000 )      ←Row A
        ( 11100            10110000000      100         100 )      <-Row B
        ( 11100            10110000000      100         011 )
        ( 11100            00000010011      100         001 )
        ( 00000            00000001000      000         000 )
        ( 00001            00000010000      000         000 )
        # 12345            12345678901      123         123
    )
```

For a particular Asin for which buyability is to be determined, the facility examines the supply_status, release_cycle, duration_type, and quantity_type fields. The facility looks in row A, treating the values as a bit flag. If all entries in the category are '0', it always matches. If the facility does not find a match in row A, it goes to row B and so own. The first match found becomes an index number where row A=index 0, row B=index 1, etc. For example, if the SupplyStatus=3, releaseCycle=4, an duration=1, quantityType=2, the facility first looks at row A, where it fails to match the supply status. Then the facility looks at row B, where supplyStatus matches, ReleaseCycle matches, Duration matches, but quantity_type fails to match. Then the facility looks at row C and find that all match.

The facility then defines, for every product group, the text strings to display for each of the index values. A sample of such a definition for book items is:

```
gpi-availability-messages = (
    ( "Availability: In Stock" "In Stock" )
    ( "Availability: On order--In stock in %Y" "In stock in %Y" )
    ( "Availability: Order on demand--In stock %Y from the date you place your order" "In stock in %Y" )
    ( "Availability: This item will be released on %DATE. You may order it now and we will ship it to you when it arrives" "Not yet published" )
    ( "Availability: THIS TITLE IS CURRENTLY OUT OF PRINT, HOWEVER, IT MAY BE AVAILABLE USED. If you would like to purchase this title, please check for used and collectible copies below, available through Marketplace sellers" "Out of print--limited availability" )
    ( "Availability: We're sorry. This item is out of stock" "Currently unavailable" )
)
# This is the default definition for buyability:
gpi-buyability = (
    ( shopping_cart one_click wishlist )
    ( shopping_cart one_click wishlist )
    ( shopping_cart one_click wishlist )
    ( shopping_cart one_click wishlist preorder )
    ( oop )
    ( out_of_stock )
)
```

This definition defines the availability messages as 'order on Demand' for the shown case, and indicates that the user can put it in the shopping_cart, purchase it using one-click purchasing, or add it to a wishlist. Note that the text strings have macro expansion that can expand to other values in Availability such as the data it is released, or the number of units that are available.

Interaction of Availability and the Purchasing Experience

When the customer views an item on a detail page, the facility shows availability information that was correct at the time the page was generated. While the customer is viewing the page, inventory could become exhausted for the item (or consume all of the inventory in the time bucket promised on the detail page). In this case, the item may have a different availability than shown, or it may indeed be unbuyable.

To catch this case, the website examines AsinAvailability information during the checkout process. If there is a change in availability, or if it becomes impossible to purchase the item(s) selected, the facility notifies the customer. The conditions tested are as follow:

For one-click purchases: When the one-click button is pressed, the facility makes sure that a unit of the item is available. This does not have to be a unit in inventory, but it can be any unit in the supply chain. The facility notifies the user of the expected ship date for the item that the user is purchasing. If there is no unit available, the facility adds the item to the user's shopping cart, and notifies the user that the unit is out of stock.

For shopping cart purchases: When the item is put in the shopping cart, the facility determines whether availability information shows sufficient stock to satisfy the order. If it does not, the facility examines the replenishment lead time to make sure that additional inventory can be obtained. If there is no more inventory available, the facility notifies the user of this fact.

When the user presses a button labeled proceed to checkout, some embodiments of the facility compute a promise to ship date by taking the date that enough units will be in inventory to fulfill the order, and then adding DC processing time, and promises the resulting time to the user. If stock is exhausted at this point, and cannot get more, the facility notifies the user of this fact. When the user presses a button labeled the 'Push this button to confirm this order', the facility once again checks for available inventory, and if inventory (including what could be obtained from vendors) is insufficient, the facility will not accept the order.

Use Cases

The cases that follow help to illustrate the flow of messages and the generation of textual characterizations of item availability. These cases each define an initial state, and describe changes to the initial state.

Use Case #1:

For Asin 123, 2 units are available in DC SEA1, and 2 units are available in DC TUL1. This item is one for which the merchant does not have a dependable replenishment source, so once these units are exhausted, the detail page for this item should indicate that it is not available to order.

```
Receive a one-click order for one unit of the Asin.
Receive a shopping cart order for two units of the Asin.
ATP decides the shopping cart order.
Shopping cart order is processed by the DC.
One-click order received by the DC.
Customer attempts to place an order for two units of the Asin and abandons.
Shopping cart order received for one unit of the Asin.
Initial state:
Gpi ->    Asin 123
          GlobalReservations = 0;
          ReplenishmentStrategy = DNR (Do not replenish)
          SEA1
                    In Inventory = 2
          TUL1
                    In Inventory = 2
GpiPendingOrders for Asin 123
          NULL
IAC ->    Asin 123
          QuantityType = NUMBER
          QuantityValue = 4;
          DurationType = KNOWN;
          BestEstimatedLeadTime = 0;
          SurityEstimatedLeadTime = 0;.
          supplyCategory;= IN_INVENTORY;
          releaseCycle;      INTERMITTENTLY_AVAILABLE
          releaseDate;       0
          calcStatus;        FOUND_ASIN
          estimatedOutOfStockDate; NA
```

Website displays text such as 'In stock' or '4 units in stock'; Buy button is presented Customer Places One-Click Order Obidos publishes order created message for order ID AAAA saying that Asin 123 has been ordered;

```
          Website.OrderMgr.CustomerOrderCreated (OrderId=AAAA,
          OrderItems= [ {Asin=123, Quantity=1}])
          Gpi Receives message, and updates GpiSharedMemory
          and Pending Orders.
Gpi ->    Asin 123
          GlobalReservations = 1;
          ReplenishmentStrategy = DNR (Do not replenish)
          SEA1
                    In Inventory = 2
          TUL1
                    In Inventory = 2
GpiPendingOrders for Asin 123
          AAAA
                    Asin 123     Quantity = 1    Assigned = 0
```

The change in availability causes a message to be sent to IACM

Cofs.Iam.AsinAvailabilityUpdate (Asin=123, LeadtimeType=Duration, Leadtime=0, LeadtimePad=0, ReleaseCycle=RELEASED_AND_AVAILABLE, SupplyCategory=IN_INVENTORY, SupplyStockQuantityType=NUMBER, SupplyStockQuantity=3)

This messages updates the information in the availability cache for all on-line boxes.

```
IAC ->    Asin 123
          QuantityType = NUMBER
          QuantityValue = 3;
          DurationType = KNOWN;
          BestEstimatedLeadTime = 0;
          SurityEstimatedLeadTime = 0;.
          supplyCategory;= IN_INVENTORY;
          releaseCycle;      INTERMITTENTLY_AVAILABLE
          releaseDate;       0
          calcStatus;        FOUND_ASIN
          estimatedOutOfStockDate; NA
```

The next time the detail page is displayed, it shows that there are '3' in inventory, and presents the buy button.

Website displays text such as 'In stock' or '3 units in stock'; Buy button is presented Customer Places a Shopping Cart Order for Two Units of the Asin, and One Other Asin Obidos publishes order created message for order ID AAAB saying that 2 units Asin 123 have been ordered, and 1 unit of Asin 456 has been ordered

```
          Website.OrderMgr.CustomerOrderCreated (OrderId=AAAA,
          OrderItems= [ {Asin=123, Quantity=2}, {Asin=456,
          Quantity = 1}])
          Gpi Receives message. Updates GpiSharedMemory
          and Pending Orders.
Gpi ->    Asin 123
          GlobalReservations = 3;
          ReplenishmentStrategy = DNR (Do not replenish)
          SEA1
                      In Inventory = 2
          TUL1
                      In Inventory = 2
GpiPendingOrders for Asin 123
          AAAA
                      Asin 123     Quantity = 1    Assigned = 0
          AAAB
                      Asin 123     Quantity = 2    Assigned = 0
                      Asin 456     Quantity = 1    Assigned = 0
```

The change in availability causes a message to be sent to IACM (Message for 456 not shown)

Cofs.Iam.AsinAvailabilityUpdate (Asin=123, LeadtimeType=Duration, Leadtime=0, Leadtime-Pad=0, ReleaseCycle=RELEASED_AND_AVAILABLE, SupplyCategory=IN_INVENTORY, SupplyStockQuantityType=NUMBER, SupplyStockQuantity=1)

This messages updates the information in the availability cache for all on-line boxes.

```
IAC ->    Asin 123
          QuantityType = NUMBER
          QuantityValue = 1;
          DurationType = KNOWN;
          BestEstimatedLeadTime = 0;
          SurityEstimatedLeadTime = 0;.
          supplyCategory;= IN_INVENTORY;
          releaseCycle;        INTERMIT1ENTLY_AVAILABLE
          releaseDate;         0
          calcStatus;          FOUND_ASIN
          estimatedOutOfStockDate; NA
```

The next time the detail page is displayed, it shows that there are '1' in inventory, and presents the buy button.

Website displays text such as 'In stock' or '1 unit in stock'; Buy button is presented The order distribution system, also called "ATP," receives the shopping cart order, and determines which DC to assign it to. In order to do this, ATP makes a request to GPI for Inventory information at the Three DCs that can possibly carry the item. (Note—some fields in this message are omitted for clarity.)

Cofs.Gpi.Request.ATPSourcingOptions (AsinInfo= [{Asin=123, Quantity=2},{Asin=456, Quantity=2}], DcsToUse=[{Dc=SEA1},{Dc=TUL1},{Dc=INGR}])

GPI replies showing the inventory for Asin 123 and 456. (In the example, Asin 456 is only in two DCs TUL1 (in 12 hours) and INGR—now)

Cofs.Gpi.Reply.ATPSourcingOptions (AsinInfo= [{Asin=123, Status=0, DcDetails=[{Dc=SEA1, Availability=[{Quantity=2, when Avail=0}]}, (Dc=TUL1, Availability=[{Quantity=2, when Avail=0}], {Asin=456, Status=0, DcDetails=[{Dc=TUL1, Availability=[{Quantity=1, when Avail=24 Hrs}]}, {Dc=INGR, Availability=[{Quantity=1, when Avail=0}]}]);

ATP decides to split the order and send the 123 to SEA1. It sends 456 to INGR (not shown).

The DC gets the order from ATP and publishes an Inventory event. (Changes to Asin 456 omitted for clarity)

Dc.Availability.InventoryChange=(Dc=TUL1, Asins [{Asin=123, Reason [{Type=OrderReceived, Id=AAAB, Delta 2], Inventory[{Bucket=Available, CountInBucket=0}, {Bucket=Customer encumber, CountInBucket=2}]])

GPI gets the message and adjusts it's inventory model. As the order is in it's PendingOrders cache, it adjusts the Global reservations by the amount provided, and modifies the PendingOrdersCache appropriately.

```
          Receives message. Updates GpiSharedMemory and Pending
          Orders.
Gpi →     Asin 123
          GlobalReservations = 1;
          ReplenishmentStrategy = DNR (Do not replenish)
          SEA1
          TUL1
                      In Inventory = 2
GpiPendingOrders for Asin 123
          AAAA
                      Asin 123     Quantity = 1    Assigned = 0
          AAAB
                      Asin 456     Quantity = 1    Assigned = 0
```

As this message has not changed the availability for inventory, no further message is generated to the website.

At a later point, GPI receives a message from the INGR DC which has Asin 546 for order AAAB. This removes all entries for AAAB from the data structures.

User Attempts to Buy 2 Units of 123

The website checks to make sure there are two units available. When the Availability information shows that there are not enough units available, it asks for the lead time to get more from the AsinAvailCalc. This looks at the vendor lead time information, etc and determines that we do not know how to get more, so it tells the customer we cannot ship the requested items.

The customer abandons the order.

One-Click Order Received by ATP and the DC 90 minutes pass and the one-click order hits ATP. ATP makes a similar call to Gpi for inventory information and assigns the order to TUL1.

The TUL1 DC generates an inventory change message for AAAA (Similar to earlier messages)

```
          Gpi Receives message. Updaes GpiSharedMemory and Pending
          Orders.
Gpi →     Asin 123
          GlobalReservations = 0;
          ReplenishmentStrategy = DNR (Do not replenish)
          SEA1
          TUL1
                      In Inventory = 1
GpiPendingOrders for Asin 123
          NULL
```

As this produces no change in inventory, we do not publish an update message.

Customer Buys One Unit Using One-Click

Obidos generates order created message indicating that 1 unit of Asin 456 has been ordered Website.OrderMgr.CustomerOrderCreated
        (OrderId=AAAC, OrderItems=[{Asin=123, Quantity=1])

Gpi receives message and updates shared memory and pending orders.

```
Gpi →    Asin 123
             GlobalReservations = 1;
             ReplenishmentStrategy = DNR (Do not replenish)
             SEA1
             TUL1
                 In Inventory = 1
         GpiPendingOrders for Asin 123
             AAAC
                 Asin 123    Quantity = 1    Assigned = 0
```

As this changes availability, GPI generates an availability message for the item showing that the item is out of stock.

Website displays text such as 'Out of Stock'. No buy button is presented.

Cofs.Iam.AsinAvailabilityUpdate (Asin=123, LeadtimeType=UNKNOWN, Leadtime=0, LeadtimePad=0, ReleaseCycle=INTERMITTENTLY_AVAILABLE,
    SupplyCategory=NOTAVAILABLE,
    SupplyStockQuantityType=UNKNOWN, SupplyStockQuantity=0)

This updates the IAC Cache:

```
IAC →    Asin 123
             QuantityType = UNKNOWN
             QuantityValue = 0;
             DurationType = UNKNOWN;
             BestEstimatedLeadTime = 0;
             SurityEstimatedLeadTime = 0;.
             supplyCategory; = NOT_AVAILABLE;
             releaseCycle;    INTERMITTENTLY_AVAILABLE
             releaseDate;     0
             calcStatus;      FOUND_ASIN
             estimatedOutOfStockDate; NA
```

When the web system next displays the detail page, it will not display the buy button based on the values returned.

Use Case #2

The merchant wants to pre-sell a hot electronics item that we have coming into its DC in 1 week. The merchant will not get any more units of this item, so it needs to be sure not to over-sell them.

The relevant initial state of GPI and the Website cache is as follows:

```
Initial state:
Gpi →    Asin 123
             GlobalReservations = 0;
             ReservationCushion = 0;
             ReplenishmentStrategy = DNR (Do not replenish)
IAC →    Asin 123
             QuantityType = UNKNOWN
             QuantityValue = 0;
             DurationType = UNKNOWN;
             BestEstimatedLeadTime = 0;
             SurityEstimatedLeadTime = 0;.
             supplyCategory; = NOT_AVAILABLE;
             releaseCycle;    INTERMITTENTLY_AVAILABLE
             releaseDate;     0
             calcStatus;      FOUND_ASIN
             estimatedOutOfStockDate; NA
```

Website shows 'Out of Stock.' Buy button is not presented (although, depending on configuration, an 'e-mail me when available' button may be presented).

The merchant will be receiving 1000 units. These are expected to sell out within 20 seconds, so inherent race conditions will cause a small amount of over-ordering. Additionally, the merchant wants to reserve some units for damaged so that, if a unit arrives damaged at a customers address, a replacement is available. The merchant decides to reserve 50 units for these contingencies. The appropriate promise date is one week from today.

GPI sets up the Gpi Shared memory to have a reserve inventory of 50:

```
Gpi →    Asin 123
             GlobalReservations = 0;
             ReservationCushion = 50;
             ReplenishmentStrategy = DNR (Do not replenish)
```

A message is received by GPI telling it to create an entry for a PO and that that entry can be used for purposes of website promise. This makes the Gpi entry look like:

```
Gpi →    Asin 123
             GlobalReservations = 0;
             ReservationCushion = 50;
             ReplenishmentStrategy = DNR (Do not replenish)
             PHL1
                 PO – DUMMY '7/31/01' order
                     1000 encumbered 0 TimeStdDev = 0
                 QuantityStdDev = 0
```

This is a change in availability, so GPI posts a message to the website saying that we have 950 available in 7 days. IACM gets this message and updates the IAC so it looks like:

```
IAC →    Asin 123
             QuantityType = NUMBER
             QuantityValue = 950;
             DurationType = DATE;
             BestEstimatedLeadTime = '7/31/01;
             SurityEstimatedLeadTime = ;.
             supplyCategory; = PO;
             releaseCycle;    INTERMITTENTLY_AVAILABLE
             releaseDate;     0
             calcStatus;      FOUND_ASIN
             estimatedOutOfStockDate ; NA
```

The next time a customer brings up the detail page, the information in the Cache makes the item buyable.

Website displays text such as 'In stock' or '950 units in stock'; Buy button is presented.

As in the foregoing scenarios, both global orders and DC orders are pending simultaneously. At one point in the process, the facility decided 300 units, and has another 200 units that have not yet been processed. At that point the Gpi model looks like:

```
Gpi →    Asin 123
            GlobalReservations = 200;
            ReservationCushion = 50;
            ReplenishmentStrategy = DNR (Do not replenish)
            PHL1
                PO – DUMMY '7/31/01'    order 1000 encumbered 300
```

The website IAC cache is set to:

```
IAC →    Asin 123
            QuantityType = NUMBER
            QuantityValue = 450;
            DurationType = DATE;
            BestEstimatedLeadTime = '7/31/01;
            SurityEstimatedLeadTime = ;.
            supplyCategory; = PO;
            releaseCycle;       INTERMITTENTLY_AVAILABLE
            releaseDate;        0
            calcStatus;         FOUND_ASIN
            estimatedOutOfStockDate; NA
```

Website displays text such as 'In stock' or '450 units in stock'; Buy button is presented.

As further inventory is consumed, at some point the net inventory reaches 0 available, and the shared memory switches to 'None Available'.

The IAC contains the following information:

```
IAC →    Asin 123
            QuantityType = UNKNOWN
            QuantityValue = 0;
            DurationType = UNKNOWN;
            BestEstimatedLeadTime = 01;
            SurityEstimatedLeadTime = ;.
            supplyCategory; = NOT_AVAILABLE;
            releaseCycle;       INTERMITTENTLY_AVAILABLE
            releaseDate;        0
            calcStatus;         FOUND_ASIN
            estimatedOutOfStockDate; NA
```

Website displays text such as 'Out of Stock.' Buy button is not presented for new detail pages, but it still is there on detail pages served before net inventory was exhausted. Additionally, a customer may be in the checkout process when net inventory was exhausted.

Now the checks on the website come into play to prevent over ordering. When the one-click ordering button is pressed, the web system checks the availability to make sure there are sufficient copies to meet the order. If not, the web system determines vendor leadtime, which is 'not available.' Accordingly, the web system does not allow the user to proceed with the order.

When the buyer puts the item in the shopping cart, the web system performs a similar check. If there is no inventory available, the web system denies the request.

When the customer proceeds to checkout the web system performs the same check.

When the customer presses the final 'buy' button, the web system performs the same check.

If at this point one of the customers cancels their order, the facility returns to having one unit available, which may be sold.

Use Case #3

Inventory in an item has been exhausted, but a PO for the item is scheduled to arrive in a few days. The merchant has chosen not to use the PO for website availability. When the PO arrives, the status of the item changes from 'Backordered' to 'In stock.'

Website shows 'Out of Stock.' Buy button is not presented. Shared memory in GPI looks like:

```
Gpi →    Asin 123
            GlobalReservations = 0;
            ReplenishmentStrategy = DNR (Do not replenish)
            SEA1
                PO – 852178 '7/31/01'   order 100 encumbered 0 Received 0
            suppressForAvailability
```

DC receives 60 units of inventory against PO 852178.

DC DIM process publishes a message saying that the Inventory has changed.

Dc.Availability.InventoryChange=(Dc=SEA1, Asins [Asin=123, Reason[Type=PO_Received, Id=852178, Delta=60], Inventory[Bucket=available, CountInBucket=60]])

The GpiDaemon updates the shared memory in Gpi As follows

```
Gpi →    Asin 123
            GlobalReservations = 0;
            ReplenishmentStrategy = DNR (Do not replenish)
            SEA1
            InInventory = 60;
                PO – 852178 '7/31/01'   order 100 encumbered 0
            Received 60;
                suppressForAvailability
```

The change in shared memory availability makes the Gpi-Daemon send a message to the Website as we have shown earlier. This message is caught by IACM and IACM updates the website availability cache.

This change in the cache changes the behavior of Obidos so the next time a detail page is presented it says something like 'In stock' or '60 units in stock' and the buy button is presented to the user.

During the day, 40 of the units are sold, and these 40 units are completely processed by the system. At the end of that processing, the GpiShared Memory is as follows:

```
Gpi →    Asin 123
            GlobalReservations = 0;
            ReplenishmentStrategy = DNR (Do not replenish)
            SEA1
              InInventory = 20;
                PO – 852178 '7/31/01'   order 100 encumbered 0 Received 50;
                    suppressForAvailability
```

The DC then receives another 40 units for the PO which is all we expect from it.

DC DIM process publishes a message saying that the Inventory has changed.

Dc.Availability.InventoryChange=(Dc=SEA1, Asins [Asin=123, Reason[Type=PO_Received, Id=852178, Delta=40], Inventory[Bucket=available, CountInBucket=60]])

This message is subscribed to by GpiDaemon, and the receipt of the message updates shared memory as follows:

```
Gpi →    Asin 123
         GlobalReservations = 0;
         ReplenishmentStrategy = DNR (Do not replenish)
         SEA1
              InInventory = 60;
```

This change in shared memory causes a message to be published for IACM. IACM retrieves the message and updates it's shared memory cache.

The next time a detail page is presented by Obidos, the information in the cache is used to display the number of units in inventory.

Use Case 4—Deciding What to Display for Units not in Inventory and Rarely Sold, but for which Supply History is Available When Obidos has to determine what to display on a detail page, it calls the AsinAvailCalc object to determine what the current availability information for the Asin is. The logic for how this works is described under Computation of Availability, and is clarified by use cases 4, 5, and 6, which address how to compute the vendor lead time to display.

If there are not outstanding POs for and Asin, or there is no inventory, and the Asin is not in a special category, the GPI system marks the Asin as 'NotTracked'. When IACM sees that an Asin is 'NotTracked,' it does not save it in its cache, and will remove it from the cache if it is there.

When Obidos calls the AsinAvailCalc object, AsinAvailCalc first looks in the Catalog data to find information about the item. Here, the Catalog database shows the Asin as 'At Distributor'.

AsinAvailCalc assigns a hard coded initial lead time value to the Asin of 2 days with 1 day pad based on the 'AtDistributor' type.

AsinAvailCalc then looks in the VendorLeadtimeDatabase to see if there is an entry for this Asin. It finds one that is (Say) 3 days with 2 day pad. It overrides the value from the Catalog with this value.

AsinAvailCalc then looks at the AvailabilityCache. In this case it finds nothing so the VendorLeadtimeDatabase information is used in showing Availability. In that case the website would display a message to the effect that we are not in stock, but our suppliers can get the item to us in 3 to 5 days.

Use Case 5—Deciding What to Display when a Last Unit of Inventory is Sold

For this item, GPI does model the inventory. However, it puts in a Vendor leadtime value based on the VendorLeadtimeDatabase (if such an entry exists) or based on the Catalog (if there is no entry in the VendorLeadtimeDatabase). An entry for Gpi might then look like.

```
Gpi ->   Asin 123
         GlobalReservations = 0;
         ReplenishmentStrategy = AUTOMATIC
         SEA1
              InInventory = 1
         RECRS
              VendorInventory 4Days TimeStdDev = .25 Quantity = 100,
              QuantityStdDev
              = .10.
```

We have a 'Dummy' DC named 'RECRS' (Recourse vendor) that has an entry for the vendor. Note that the entry (as to all inventory entries) include StandardDeviation values for time and quantity, omitted from earlier examples for clarity.

At this time the website shows 'In Inventory' or '1 unit in inventory' and the buy button is displayed.

When the unit in inventory is sold, the GlobalReservations is increased to 1, and this causes an AsinAvailabilityUpdate message to be published. In order to do so, GPI computes the proper lead time and units to display.

GPI does this by first examining a configuration file that says how many standard deviations it should pad its estimate by—here, 2 standard deviations.

GPI takes the median time for delivery of goods (4 days) and multiplies that value by the number of standard deviations, and the TimeStdDev. It then uses that number as the pad. In this case the formula would be:

4 Days*0.25*2=2 Days

GPI publishes the lead time as 4 days, with a pad of 2 days.

GPI takes the quantity of supply, multiplies that value by the number of standard deviations, and the quantityStdDev, and subtracts the number from the original quantity and publishes that as the number available. In this case the calculation is:

100−(100*0.10*2)=80 Units available.

GPI publishes the number of units available as 80;

IACM receives this message, stores the data in shared memory, and on the next detail page displays a message to the effect of:

'We are out of stock, but we can get 80 units in 4 to 6 days from our partner.'

Use Case 6—Deciding What to Display for an Item that the Merchant has Never Sold, and has No Supply History for For items for which no supply history is available, and for which there are no entries in the VendorLeadtimeDatabase, Obidos simply uses the Catalog values. For example.

Obidos asks AsinAvailCalc for the availability for an Asin.
AsinAvailCalc looks at the Catalog and determines that the item is 'Backordered' and assigns a default vendor lead time of '2 to 4 weeks'.
AsinAvailCalc then looks at the VendorLeadtimeDatabase and finds nothing.
AsinAvailCalc then looks at the AvailabilityCache and finds nothing for that Asin.
AsinAvailCalc then returns the availability as '2 weeks, with a 2 week pad' and 'Quantity unknown';

The website displays a message to the effect of 'We are out of stock, but our partner can supply us in 2 to 4 weeks."

Use Case 7—Expiration or Exhaustion Dates.

The system computes when it expects an Asin will go out of stock ("the Exhaustion date"). This is returned to Obidos from AsinAvailCalc in the field estimatedOutOfStockDate This use case discusses how this value is set, and shows the user interaction.

Let's assume that inventory includes 1000 units that the merchant obtained at a special price. The merchant wants to sell these units, but cannot replenish them. Based on inventory information, GPI creates an entry in its shared memory as follows:

```
Gpi ->   Asin 123
         GlobalReservation = 0;
         ReplenishmentStrategy = DNR (Do not replenish)
         ExhaustionDate = 0;
         SEA1
              InInventory = 1000;
```

Note the new field in this display 'ExhaustionDate,' omitted from earlier examples for clarity. As the facility has no sales history for this item, we set this field to '0';

The item goes on sale at Noon on January 1, and the website displays language such as:

'In Stock' or 'In stock—1000 units available';

As the Website takes orders, it publishes 'OrderCreatedMessages' as defined above. The GpiRunRateCollector subscribes to these messages, and builds a histogram of order activity in an Oracle table. This histogram has one hour buckets for recent history, and day granularity buckets for more ancient history.

After one hour, 10 orders have been accepted, and the histogram looks like:

10 0 0 0 0 0 0 0 0 0 . . . (for N days of hour information)

The GpiRunRateCalculator, which periodically executes, looks at the histogram at this point, and determines that the run-rate is 10 units per hour for the last hour, and no units before this. One hour of data is not enough, so it does nothing.

After two hours we have taken 19 orders, and the histogram looks like:

9 10 0 0 0 0 0 0 0 0 . . . .

When the GpiRunRateCalculator next starts up, it looks at these numbers and identifies a trend. It calculates a run rate (in this case, 9.5 units per hour). It sees that 981 units remain by looking at the GpiShared Memory. It computes a projected run rate in the future of 9.5 with no change. It divides the remaining inventory (981) by 9.5, yielding a remaining time to "stock out" of 103 hours. This converts to four days and 7 hours. The GpiRunRateCalculator updates the shared memory with this time setting it to:

```
Gpi ->    Asin 123
          GlobalReservations = 0;
          ReplenishmentStrategy = DNR (Do not replenish)
          ExhaustionDate = Jan 5 - 17:00
          SEA1
                    InInventory = 981;
```

The website does not change the availability characterization that it displays on the item detail page.

After several hours, at Noon of January 2, the histogram looks like:

30 25 22 20 18 17 15 14 16 18 10 12 15 15 17 18 14 13 17 13 . . . .

600 units remain to be sold.

At the next calculation by GpiRunRateCalculator, the calculator determines a new projection of run rate. In this case it sees that the rate of consumption is increasing, and the future pattern is expected to look like:

35 40 45 50 55 60 65 70 75 80 90 90 90 90 90 90 90 90

(Actual values simplified for legibility)

GpiRunRateCalculator computes that the item is expected to stock out in approximately 5 hours and 15 minutes, and updates the in memory model to be as follows:

```
Gpi ->    Asin 123
          GlobalReservations = 0;
          ReplenishmentStrategy = DNR (Do not replenish)
          ExhaustionDate = Jan 2 - 17:15
          SEA1
                    InInventory = 600;
```

As this time is less than a day away, the website availability message would change to something like:

'Limited Inventory—based on sales history we expect to be out of stock on this item in less than 24 hours.'

Use Case 8—Bundles

This use case is designed to illustrate the use of item bundles.

Bundles are defined in an Oracle database. Bundle definitions in the database consist of the Bundle Asin, and the Leaf Asin. For example, if we have two bundles—one of 2 Asins, and one of 3 Asins. The database table might look like:

| BundleAsin | LeafAsin |
|---|---|
| 11111 | 00001 |
| 11111 | 00002 |
| 11111 | 00003 |
| 22222 | 00003 |
| 22222 | 00004 |

Note that Asin 00003 is in two bundles.

Sample Gpi structures for the Asins are as follows:

```
Gpi ->    Asin 00001
          GlobalReservations = 0;
          ReplenishmentStrategy = DNR (Do not replenish)
          SEA1
                    InInventory = 600;
Gpi ->    Asin 00002
          GlobalReservations = 0;
          ReplenishmentStrategy = VIRTUAL
Gpi ->    Asin 00003
          GlobalReservations = 0;
          ReplenishmentStrategy = DNR (Do not replenish)
          SEA 1
                    InInventory = 6;
          PHL1
                    InInventory 1;
Gpi ->    Asin 00004
          GlobalReservations = 0;
          ReplenishmentStrategy = DNR (Do not replenish)
          SEA1
                    Reserve (48 hours) 15;
          PHL1
                    InInventory = 20;
Bundle Asins are created that are the union of this inventory:
Gpi ->    Asin 11111
                              GlobalReservation = 0
          ReplenishmentStrategy = DERIVED
          SEA1
          InInventory = 6;
Gpi ->    ASIN 2222
          GlobalReservation = 0
          ReplenishmentStrategy = DERIVED
          SEA1
          Reserve (48 hours) = 6;
          PHL1
                    InInventory 1;
```

The Website display for 11111 is '6 units in inventory.'

The Website display for 22222 is '1 unit in inventory.'

A customer enters an order for a 1111 bundle. Obidos publishes a CustomerOrderCreated message which contains Asin 1111, a 0001, an 0002, and an 0003.

The GpiDaemon receives the message and updates the shared memory for the leaf Asins (0001, 0002, and 0003); it then publishes a 'LeafChange' message for each Asin (001, 002, 003) which the GpiBundleDaemon listens to.

At this point the three Asins (001, 002, and 003) have a global inventory set to 1.

When the GpiBundleDaemon gets a Leaf Change message, it gets a list of all of the Bundle's that are parents to that leaf. It puts the Asin of the bundles in a queue. (Duplicate entries are excluded from the queue). In this example, when the GpiBundleDaemon has received all three leaf change events, the queue contains two entries (11111, 22222).

At a later point in time, (i.e., within a few seconds) a timer expires and processes all bundles in the queue. Processing consists of taking each bundle in the queue, getting the leaf nodes for the bundle, and combining those nodes to create a new availability for the bundle. The new bundle availability is then written to the GPI Database and if that causes and availability change, the GpiBundleDaemon publishes an AvailabilityChangeMessage.

In response, the shared memory for the leaf Asins is as follows:

```
Gpi ->    Asin 00001
          GlobalReservations = 1;
          ReplenishmentStrategy = DNR (Do not replenish)
          SEA1
                  InInventory = 600;
Gpi ->    Asin 00002
          GlobalReservations = 1;
          ReplenishmentStrategy = VIRTUAL
Gpi ->    Asin 00003
          GlobalReservations = 1;
          ReplenishmentStrategy = DNR (Do not replenish)
          SEA1
                  InInventory = 6;
          PHL1
                  InInventory 1;
Gpi ->    Asin 00004
          GlobalReservations = 0;
          ReplenishmentStrategy = DNR (Do not replenish)
          PHL1
                  InInventory = 20;
```

The first bundle '11111' is computed by:

creating a bundle from Asin 00001 and 00002; obtaining a clone data structure that represents Asin 00001 and 00002; creating a data structure to represent the intermediate bundle; and looking at the replenishment Strategy of the two Asins, and noticing that one of them is virtual (i.e., we have an unlimited supply.) That means that the facility simply makes the bundle look like the non-virtual bundle.

```
Asin - TempBundle
    GlobalReservations = 1;
    ReplenishmentStrategy = BUNDLE
    SEA 1
    InInventory = 600;
```

The facility then combines the TempBundle with the next Asin, 00003.

Because there are no virtuals, the first thing the facility does is to strip out the global reservations. The facility does this pessimistically: it takes enough global reservations from every DC, as it cannot be sure which DC will actually be used. Here is what the data structures look like after the global inventory has been striped out:

```
Asin - TempBundle( 00001 + 00002)
    GlobalReservations = 0;
    ReplenishmentStrategy = BUNDLE
    SEA1
    InInventory = 599;
```

```
Gpi ->    Asin 00003
          GlobalReservations = 0;
          ReplenishmentStrategy = DNR (Do not replenish)
          SEA1
                  InInventory = 5;
          PHL1
                  InInventory 0;
```

The facility then goes through the inventory for each DC and computes how many would be available at both DCs as time advances into the future. For SEA1, the facility sees that at time 0 (i.e., in current inventory) the minimum available is 5. As no more units are arriving in the future for Asin 00003, that is all that can be moved into the new tempBundle Also notice that there is not even a PHL1 DC for TempBundle(00001+00002); this implies that the new temp bundle will not have PHL1 at all.

The Temp bundle then becomes

```
Asin - TempBundle( 00001 + 00002 + 00003)
    GlobalReservations = 0;
    ReplenishmentStrategy = BUNDLE
        SEA1
            InInventory = 5;
```

GpiBundleDaemon replaces the entry for the bundle Asin 11111 with this tempBundle. This causes a change in availability and an AvailabilityUpdate message is propagated by GPI. The IACM gets the message, updates its cache, and the next time a detail page is presented for Asin 11111, it shows '5 units in stock';

Then the GpiBundleDaemon processes the second bundle (22222);

It gets the leaf nodes

```
Gpi ->    Asin 00003
          GlobalReservations = 1;
          ReplenishmentStrategy = DNR (Do not replenish)
          SEA1
                  InInventory = 6;
          PHL1
                  InInventory 1;
Gpi ->    Asin 00004
          GlobalReservations = 0;
          ReplenishmentStrategy = DNR (Do not replenish)
          SEA1
                  Reserve (48 hours) 15;
          PHL1
                  InInventory = 20;
```

Following the model above, the facility first strips out Global inventory from Both Asins, leaving:

```
Gpi ->    Asin 00003
          GlobalReservations = 0;
          ReplenishmentStrategy = DNR (Do not replenish)
          SEA1
                  InInventory = 5;
          PHL1
                  InInventory 0;
```

-continued

```
Gpi ->    Asin 00004
          GlobalReservations = 0;
          ReplenishmentStrategy = DNR (Do not replenish)
          SEA1
                        Reserve (48 hours) 15;
          PHL1
                        InInventory = 20;
```

The facility then creates a TempAsin composite that looks like:

```
Gpi ->    TempAsin
               ReplenishmentStrategy = Composite
          SEA1
                        Reserve(48 hours) 5
          PHL1          0
``` and updates the Asin 22222. This causes a change in availability and a change in the detail page status to '15 units available in 48 hours'

At a later point, the bundle is sent to the SEA1 DC for fulfillment. This generates an inventoryUpdate message from the DC against a specific order id. This message is consumed by the GpiDaemon and it modifies it's shared memory to reflect that we have consumed the global inventory and assigned it to a DC. The leaf Asins are changed to be as follows:

```
Gpi ->    Asin 00001
          GlobalReservations = 0;
          ReplenishmentStrategy = DNR (Do not replenish)
          SEA1
                        InInventory = 599;
Gpi ->    Asin 00002
          GlobalReservations = 0;
          ReplenishmentStrategy = VIRTUAL
Gpi ->    Asin 00003
          GlobalReservations = 0;
          ReplenishmentStrategy = DNR (Do not replenish)
          SEA1
                        InInventory = 5;
          PHL1
                        InInventory 1;
Gpi ->    Asin 00004
          GlobalReservations = 0;
          ReplenishmentStrategy = DNR (Do not replenish)
          SEA1
                        Reserve (48 hours) 15;
          PHL1
                        InInventory = 20;
```

Again this causes a leaf change to be published, and bundles to be recomputed in the bundle daemon.

Note that when bundle 22222 is computed, some inventory is available in PHL1. The temp Asin looks like:

```
Gpi ->    TempAsin
          GlobalReservation = 0
          ReplenishmentStrategy = DERIVED
          SEA1
                        Reserve(48 hours) 5
          PHL1
                        InInventory = 1;
```

When the GpiBundleDaemon updates this information, it publishes an AsinAvailChange message, and the website will then display '1 unit in stock' for the bundle Asin.

In some embodiments, the facility uses a PromiseCalculator function to determine a "promise date" for the order—that is, a day on which to indicate the order will be shipped. In some alternate embodiments, the term promise date refers to a on which the facility indicates the order will be received by the user. Promise dates are typically expressed as a number of days from the current date, but may also be expressed as an absolute date. PromiseCalculator is presented with an order containing one or more ordered items. As part of generating the order, the user has determined whether the order should ship when all items are available or ship in groups as items become available.

For each item in the order, PromiseCalculator uses the Availability system to see how long it will take for the needed number to become available. If the quantity ordered of an item is more than the quantity available as reported by the AsinAvailCalc, PromiseCalculator uses the lead time from our recourse vendor to determine a promise date for that item. This lead time to 'in inventory' is expressed as a range of values based on the appropriate certainty level and return the median number, and a pad number. (E.g., a reported range of 48 to 96 hours means that the median is 2 days, and the 85% certainty date is 4 days.)

For an order designated to ship when all items are available, PromiseCalculator sums (a) the maximum median number, (b) the maximum certainty number, and (c) a DC processing factor, which is a global estimate of how long it will take an average DC to ship an item of this item type once it is in stock. The facility delivers the result to the customer as a promise.

For an order designated to ship in groups as items become available, PromiseCalculator groups the estimated availability dates into 'close groupings,' and uses the maximum of the above calculation for each grouping as a promise for the items in that group. The facility then adds the DC lead time and delivers that as a promise to the customer.

In all cases, the DC lead time can typically be adjusted due to backlog.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

The invention claimed is:

1. A computer-implemented method for identifying a length of time required to fulfill an order including multiple items, comprising:
   using one or more computers to perform:
      receiving a request for a length of time required to fulfill a portion of an order that includes items of a group comprising a plurality of items of the order to be shipped in a single shipment from a facility;
      for each item of the group, determining a preparation time needed to prepare the item for shipment;
      wherein, at a time of said determining, at least one item of the group is in a physical inventory at the facility and at least one item of the group is not in the physical inventory at the facility;
      wherein for each at least one item of the group in the physical inventory at the facility, the preparation time is determined based on an amount of time expected to be needed to prepare the item for shipment from the facility;

wherein for each at least one item of the group not in physical inventory at the facility, the preparation time is dynamically determined in response to said receiving the request, wherein:
the dynamic determination is based on a determined amount of time expected to be needed to obtain the item into the physical inventory and an amount of time expected to be needed to prepare the item for shipment from the facility, and
the dynamic determination is dependent upon records indicating one or more outstanding restocking orders for the at least one item or upon indications of the inventory in the at least one item of particular suppliers;
determining a length of time required to fulfill the portion of the order that includes the items of said group, wherein the determined length of time is the longest preparation time of the preparation times determined for the items of the group; and
reporting the length of time required to fulfill the portion of the order that includes the items of the group.

2. The method of claim 1 wherein the dynamic determination is dependent upon the amount of time historically required for particular suppliers to fulfill restocking orders for the at least one item.

3. The method of claim 1, further comprising:
receiving a request for the length of time required to fulfill the portion of the order that includes the items of said group; and
in response to the receiving the request, for each item in said group, dynamically determining the amount of time expected to be needed to prepare that item for shipment when it is in physical inventory.

4. The method of claim 3 wherein the dynamic determination is dependent upon the amount of time historically required to prepare items for shipment when in physical inventory.

5. The method of claim 3 wherein for each item in said group, the dynamic determination is dependent upon the amount of time historically required to prepare items of the same item category as that item for shipment when in physical inventory.

6. The method of claim 3 wherein for each item in said group, the determination is dependent upon the amount of time historically required to prepare items of the same item category as that item for shipment when in physical inventory at one or more particular distribution facilities.

7. The method of claim 3 wherein the dynamic determination is made with reference to the amount of time historically required to prepare the items of the group for shipment when in physical inventory.

8. The method of claim 1 wherein the web page describes the order.

9. The method of claim 1, further comprising receiving the order from a customer, and wherein the reporting comprises adding the length of time required to fulfill the portion of the order that includes the items of said group to an electronic mail message to the customer describing the order.

10. The method of claim 8 wherein the reporting comprises adding the length of time required to fulfill the portion of the order that includes the items of said group to the web page describing the item before the items of said group have been ordered.

11. The method of claim 1, further comprising:
receiving the order specifying that the items of the group be delivered to a designated destination; and
adding to the length of time required to fulfill the portion of the order that includes the items of said group an amount of time expected to be needed to ship the items of said group to the designated destination.

12. The method of claim 1, further comprising determining the length of time required to fulfill the portion of the order that includes the items of said group based upon a specified minimum level of statistical certainty.

13. The method of claim 1 wherein the method is performed in a web server computer system.

14. The method of claim 1 wherein, for at least one item of the group, the amount of time expected to be needed to obtain the item into the physical inventory includes an amount of time expected to be needed to obtain the item from an external supplier.

15. A non-transitory computer-readable storage medium whose contents cause a computing system to identify a length of time required to fulfill an order including multiple items by:
receive an order specifying that multiple items be delivered to a designated destination;
for each item of a group comprising a plurality of items of the order to be shipped in a single shipment from a facility, determining a preparation time needed to prepare the item for shipment;
wherein, at a time of said determining, at least one item of the group is in a physical inventory at the facility and at least one item of the group is not in the physical inventory at the facility;
wherein for each at least one item of the group in the physical inventory at the facility, the preparation time is determined based on an amount of time expected to be needed to prepare the item for shipment from the facility;
wherein for each at least one item of the group not in physical inventory at the facility, the preparation time is determined based on a determined amount of time expected to be needed to obtain the item into the physical inventory and an amount of time expected to be needed to prepare the item for shipment from the facility;
determining a length of time required to fulfill a portion of the order that includes the items of said group, wherein the determined length of time is the longest preparation time of the preparation times determined for the items of the group;
adding to the length of time required to fulfill the portion of the order that includes the items of said group an amount of time expected to be needed to ship the items of said group to the designated destination; and
reporting the length of time required to fulfill the portion of the order that includes the items of said group.

16. A computing system for identifying the length of time required to fulfill an order including multiple items, comprising:
one or more computers configured to implement:
receiving the order specifying that the items of the group be delivered to a designated destination
a first subsystem that is configured to, for each item of a group comprising a plurality of items of the order to be shipped in a single shipment from a facility, determine a preparation time needed to prepare the item for shipment;
wherein, at a time of said determining, at least one item of the group is in a physical inventory at the facility and at least one item of the group is not in the physical inventory at the facility;

wherein for each at least one item of the group in the physical inventory at the facility, the preparation time is determined based on an amount of time expected to be needed to prepare the item for shipment from the facility;

a second subsystem that is configured to, for each at least one item of the group not in physical inventory at the facility, determine a preparation time based on an amount of time expected to be needed to obtain the item into the physical inventory and an amount of time expected to be needed to prepare the item for shipment from the facility; and a third system configured to determine a length of time required to fulfill a portion of the order that includes the items of said group based upon a specified minimum level of statistical certainty, and report the length of time required to fulfill the portion of the order that includes the items of said group; wherein the determined length of time is the longest preparation time of the preparation times determined for the items of the group.

17. A computer-implemented method, comprising:

using one or more computers to perform:

receiving a request for a length of time required to fulfill a portion of an order that includes items of a group comprising a plurality of items of the order to be shipped in a single shipment from a facility;

for each item of the group, determining a preparation time needed to prepare the item for shipment;

wherein, at a time of said determining, at least one item of the group is in a physical inventory at the facility and at least one item of the group is not in the physical inventory at the facility;

wherein for each at least one item of the group in the physical inventory at the facility, the preparation time is dynamically determined in response to said receiving the request, wherein:

the dynamic determination is based on an amount of time expected to be needed to prepare the item for shipment from the facility, and the dynamic determination is dependent upon the amount of time historically required to prepare items for shipment when in physical inventory;

wherein for each at least one item of the group not in physical inventory at the facility, the preparation time is determined based on a determined amount of time expected to be needed to obtain the item into the physical inventory and an amount of time expected to be needed to prepare the item for shipment from the facility;

determining a length of time required to fulfill a portion of the order that includes the items of said group, wherein the determined length of time is the longest preparation time of the preparation times determined for the items of the group; and reporting the length of time required to fulfill the portion of the order that includes the items of the group.

* * * * *